United States Patent
Steinert et al.

(10) Patent No.: US 12,177,497 B2
(45) Date of Patent: Dec. 24, 2024

(54) METHOD AND VIDEO CONTROLLER FOR CONTROLLING DELIVERED VIDEO

(71) Applicant: Fraunhofer-Gesellschaft zur Förderung der angewandten Forschung e.V., Munich (DE)

(72) Inventors: Fabian Steinert, Berlin (DE); Robert Seeliger, Berlin (DE); Stefan Arbanowski, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 163 days.

(21) Appl. No.: 17/640,057

(22) PCT Filed: Sep. 9, 2020

(86) PCT No.: PCT/EP2020/075183
§ 371 (c)(1),
(2) Date: Mar. 3, 2022

(87) PCT Pub. No.: WO2021/048198
PCT Pub. Date: Mar. 18, 2021

(65) Prior Publication Data
US 2022/0337892 A1    Oct. 20, 2022

(30) Foreign Application Priority Data
Sep. 10, 2019  (DE) .................... 10 2019 213 741.5

(51) Int. Cl.
*H04N 21/234*    (2011.01)
*H04N 21/2187*   (2011.01)
(Continued)

(52) U.S. Cl.
CPC ... *H04N 21/23424* (2013.01); *H04N 21/2187* (2013.01); *H04N 21/2625* (2013.01);
(Continued)

(58) Field of Classification Search
CPC ......... H04N 21/23424; H04N 21/2187; H04N 21/2625; H04N 21/812; H04N 21/8133;
(Continued)

(56) References Cited

U.S. PATENT DOCUMENTS 6,505,169 B1    1/2003  Bhagavath et al.
9,066,138 B1    6/2015  Kraiman et al.
(Continued)

FOREIGN PATENT DOCUMENTS

| EP | 2868097      | 5/2015 |
| WO | 2019073266 A1 | 4/2019 |
| WO | 2019118699 A1 | 6/2019 |

OTHER PUBLICATIONS

"MI-EMO: DASH Robustness Tools for Live Services", Qualcomm Incorporated, May 2014, pp. 1-22, vol. S4-140585, 3GPP TSG-SA4 #79, Sophia Antipolis, France.

*Primary Examiner* — Chenea Davis
(74) *Attorney, Agent, or Firm* — The Webb Law Firm

(57) ABSTRACT

It is provided a method for controlling delivered video based on a source video. The source video includes a first video sequence followed by a first replacement time slot, the first replacement time slot followed by a third video sequence. The method includes requesting a second video sequence with a maximum duration $T_{req}$ by a video controller to be inserted into a time slot corresponding to the first replacement time slot in the delivered video. The duration $T_2$ of the second video sequence is shorter or equal to $T_{req}$, determining the time difference $T_{10}-T_2$ between the duration $T_{10}$ of the first replacement time slot and the duration of the second video sequence by the video controller; placing the second video sequence by the video controller into a time slot in the delivered video corresponding to first replacement time slot and shifting the subsequent third video sequence towards the second video sequence in the delivered video, and thereby (Continued)

providing a continuous video stream through influencing of the delay between the video source and the delivered video.

10 Claims, 3 Drawing Sheets

(51) Int. Cl.
 *H04N 21/262* (2011.01)
 *H04N 21/81* (2011.01)
(52) U.S. Cl.
 CPC ....... *H04N 21/812* (2013.01); *H04N 21/8133* (2013.01); *H04N 21/814* (2013.01)
(58) Field of Classification Search
 CPC ........... H04N 21/814; H04N 21/26233; H04N 21/26258; H04N 21/2668; H04N 21/8456
 See application file for complete search history.

(56) References Cited

U.S. PATENT DOCUMENTS

| | | |
|---|---|---|
| 9,407,940 B1 | 8/2016 | Bertz et al. |
| 2014/0068648 A1 | 3/2014 | Green et al. |
| 2014/0149210 A1 | 5/2014 | Ma et al. |
| 2015/0269629 A1 | 9/2015 | Lo et al. |
| 2016/0165319 A1 | 6/2016 | Sun |
| 2016/0182923 A1 | 6/2016 | Higgs et al. |
| 2017/0062007 A1 | 3/2017 | Chakravarthy et al. |
| 2017/0131967 A1* | 5/2017 | Nieuwenhuys ......... G06F 3/165 |
| 2018/0199074 A1 | 7/2018 | Potesta |
| 2019/0007713 A1 | 1/2019 | Venkatraman et al. |
| 2019/0045242 A1 | 2/2019 | Einarsson et al. |
| 2019/0174184 A1 | 6/2019 | McCallister et al. |
| 2019/0179865 A1 | 6/2019 | Choi et al. |
| 2019/0246158 A1* | 8/2019 | Martell .............. H04N 21/8456 |
| 2020/0213645 A1* | 7/2020 | Sodagar ........... H04N 21/23424 |
| 2021/0192567 A1 | 6/2021 | Henderson et al. |

\* cited by examiner

METHOD AND VIDEO CONTROLLER FOR CONTROLLING DELIVERED VIDEO

CROSS-REFERENCE TO RELATED APPLICATIONS

This application is the United States national phase of International Application No. PCT/EP2020/075183 filed Sep. 9, 2020, and claims priority to German Patent Application No. 10 2019 213 741.5 filed Sep. 10, 2019, the disclosures of which are hereby incorporated by reference in their entirety.

BACKGROUND OF THE INVENTION

Field of the Invention

The disclosure relates to a method for controlling delivered video and a video controller for controlling delivered video.

Description of Related Art

In a video source such as e.g. a live video stream using HLS (HTTP Live Streaming) or DASH (Dynamic Adaptive Streaming over HTTP), it is possible to replace certain parts with a replacement time slot (starting at a relative or absolute point in time and having a well-defined duration) for content blocks from other sources (e.g., to be replaced by (individual) advertising blocks, broadcast content, program/content announcements, regionalized content, emergency notifications). Therefore, a video controller can dynamically insert content (i.e. a requested video sequence) into delivered video.

Today, if the inserted video sequence (with e.g. one or more advertisements) is shorter than the assigned time slot for the insertion, so-called slates (e.g. ad-slates) are inserted into the delivered video to completely fill the time slot. This is e.g. described in EP 2 868 097 A1.

This procedure has disadvantages.

Especially for very short gaps (e.g. <0.5 seconds) resulting from a nearly fitting insertion, this would result in an unpleasant user experience due to the very short cut ("jerky picture" or "stuttering sound").

Slate content is only filler material that is neither desired nor commercially relevant in the delivered video. Especially very small differences between the duration of the replacement time slot and the duration of the inserted video sequence leads to technical problems when playing the delivered video. The technical problems are caused in particular by differences in format and can, in the worst case, result in re-initializations of the video player. The consequences might e.g. be stream aborts or incorrect player behaviour like stalling.

Alternatively, if slate content were completely omitted, the resulting temporal offsets in the resulting delivered video (e.g. a live stream) were accumulated over time, resulting in a lack of video to display. This happens when the video buffer in the client is used up by the data difference between elapsed streaming time and elapsed display duration.

When replacing video content in a source video, such as a live stream, the duration (time length) of the inserted content has to correspond to the duration of the replacement time slot. Otherwise there will be a shift at the "live edge" of the video, i.e. the delivered video falls behind the video source in time if the inserted material is longer than the original.

If the inserted video sequence is too short for the replacement time slot, the video player is potentially no longer able to access video material needed at the live edge. The stream would stop until more footage becomes available.

US 2014/0 068 648 A1 discloses systems, methods and articles to provide content in network environment. A content delivery system may include a metadata tunnel system component which is responsive to defined subaudible tones in programming, for instance programming provided for a broadcast. An action may be based on a characteristic or aspect of the subaudible tone, for instance frequency and/or duration. The metadata tunnel system may selectively generate or provide modified or new metadata to downstream components (e.g., injector system, encoder). The metadata tunnel system may provide metadata that causes a content provider identifier that identifies a content provider to appear in an alternative feed of programming (e.g., streaming programming) at points downstream of a broadcaster, for instance at end user media players. The metadata tunnel system may provide metadata that inhibits an injector system from injecting (e.g., inserting, substituting) new content into the alternative feed of programming created from portions of broadcast programming.

SUMMARY OF THE INVENTION

Therefore, methods and video controllers are required to efficiently handle the exchange of insertion time slots by video sequences in delivered video.

This is addressed by a method with features as described herein.

A source video comprises a first video sequence followed by a first replacement time slot which in turn is followed by a third video sequence. Hence, this embodiment works on three consecutive video sequences. Both the first and the third video sequence may recursively be substructured into video sequences and insertion time slots like a (complete) source video and handled accordingly.

A video controller first requests a second video sequence to be inserted into the time slot corresponding to the replacement time slot in the delivered video. The corresponding time slot in this case in the delivered video is the time slot which follows the first video sequence.

The duration $T_2$ of the second video sequence is shorter or equal to $T_{req}$, i.e. the duration of the request video sequence. This represents a maximum duration for the second video sequence. The duration $T_2$ of the second video sequence can in particular be different from the duration $T_{10}$ of the first replacement time slot, i.e. it can be longer or shorter.

Then, the video controller determines the time difference $T_{10}-T_2$ between the duration of the first replacement time slot $T_{10}$ and the duration $T_2$ of the second video sequence.

Subsequently, the video controller places the second video sequence into a slot in the delivered video corresponding to the first replacement time slot and shifts the subsequent third video sequence (and all subsequent sequences) towards the second video sequence in the delivered video and thereby providing a continuous video stream through influencing of the delay between the video source and the delivered video.

With this method, e.g. a shorter video sequence can be inserted without the necessity of inserting slates at this point, as the subsequent video sequence is shifted.

In a further embodiment, the time difference $T_{10}-T_2$ between the duration of the first replacement time slot and the second video sequence (i.e. the inserted content) is used by the video controller to adapt a duration $T_{req2}$ of at least one further requested video sequence for a replacement time slot. With this embodiment, negative and positive temporal deviations between the source and the delivered video sequence (i.e. negative and positive delays) can be adjusted to prevent too large deviations. In a further embodiment, a temporal adjustment offset $T_n$ can be added by the video controller to the requested duration $T_{req}$ of the second video sequence and/or the requested duration $T_{req2}$ of the at least one second video sequence. In particular, the video controller can adjust the duration of the adjustment offset $T_n$ to control the delay between source video and delivered video.

The source video can be a timed video stream, a scheduled video stream, live linear video stream and or live live linear video stream.

Furthermore, the source video can e.g. be a timed video stream or a scheduled video stream. It is also possible, that the source video is an Internet video stream, in particular an HLS or DASH video stream.

In one embodiment, the third video sequence is e.g. shifted towards the inserted second video sequence so that there is not time gap between the two video sequences.

In one embodiment, the content of the second video sequence is personalized, in particular using an ID for a particular delivery device. The content of the second video e.g. comprises advertising content, broadcast content, program/content announcements, regionalized content and/or emergency notifications. It is also possible, that the request of the second video sequence by the video controller is a personalized request.

The issue is also addressed by a video controller with features as described herein.

BRIEF DESCRIPTION OF THE DRAWINGS

Exemplary embodiments of the method and system are described in the context of figures

DESCRIPTION OF THE INVENTION

Figure 1:
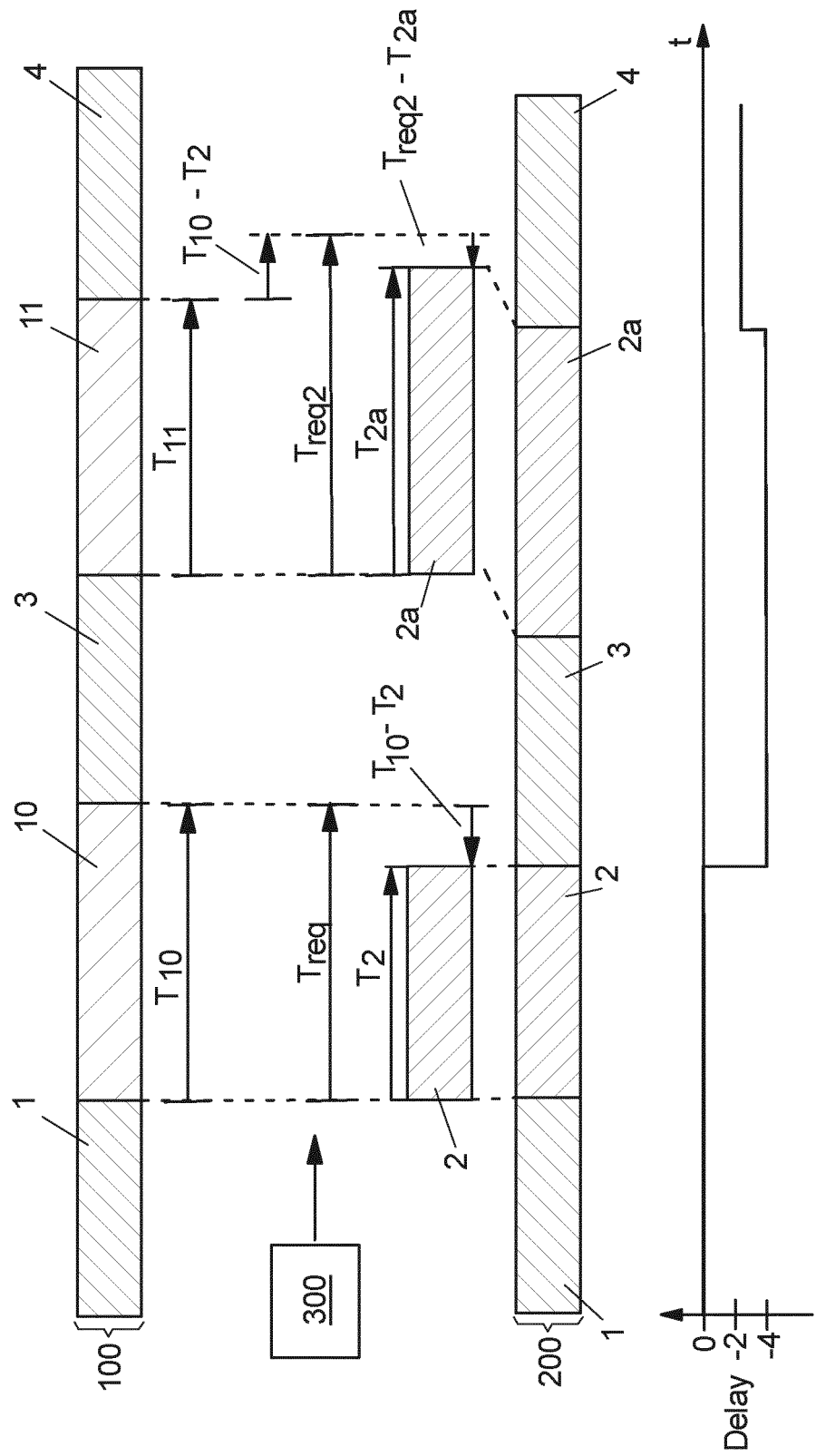
FIG. 1 shows two insertions of video sequences into a delivered video by different embodiments.

In FIG. 1 different embodiments of a method and a system for controlling delivered video are described.

A video source 100 comprises the video sequences that eventually become the delivered video 200. The video source 100 can e.g. be a live video, i.e. video data that is to be displayed with no or only a marginal temporal delay to a real-time event. The source video 100 can e.g. also be video data generated apart from live events (i.e. real-time events). The delivered video 200 can e.g. be provided over the Internet, over video-on-demand or over other TV channels.

A video controller 300 controls the processing of the video source 100 and the delivered video 200. The video controller 300 can be one computer or a computer network with several computers, handling different aspects of the video processing. Some aspects of the video processing are described below in the context of embodiments.

The video source 100 comprises a plurality of video sequences 1, 3, 4 and of replacement time slots 10, 11 and the delivered video 200 comprises a plurality of video sequences 1, 2, 2a, 3, 4. (The plurality of video sequences and replacement time slots in the video source results from the possible substructure described above.)

A first embodiment is shown by the left hand side of FIG. 1.

The video source 100 comprises a first video sequence 1 which is immediately (i.e. without a temporal gap) followed by a first replacement time slot 10 with a duration $T_{10}$. The first replacement time slot 10 is followed by a third video sequence 3.

In the first embodiment, the video controller 300 requests additional video content for the first replacement time slot 10. This additional content can e.g. be an advertisement, in particular a personalized advertisement.

In this embodiment a duration $T_{req}$ of the requested additional video content is equal to the duration $T_{10}$ of the first replacement time slot 10. In other embodiments, the duration $T_{req}$ of the requested content is different from the duration $T_{10}$ of first replacement time slot 10, as will be discussed below.

A replacement video sequence 2 returned to the video controller 300 as the result of the request for additional video content here (second video sequence 2) has a duration $T_2$, being shorter than $T_{10}$. The video controller 300 determines the difference $T_{10}-T_2$ of the durations of the first replacement time slot 10 and the replacement video sequence 2.

The replacement video sequence 2 is placed in the delivered video 200 at the corresponding position of the first replacement time slot 10 by the video controller 300. This means that the replacement video sequence 2 becomes video sequence 2 following the first video sequence 1 in the delivered video, as the replacement time slot 10 follows the first video sequence 1 in the source video 100.

In this case the replacement video sequence 2 has a shorter duration than the first replacement time slot 10, therefore the subsequent third video sequence 3 of the source video is shifted by the video controller 300 towards the second video sequence 2 in the delivered video 200 since $T_2$ is smaller than $T_{10}$.

In the embodiment shown, the shift results in no temporal gap between the first video sequence 1 and the second video sequence 2. In other embodiments, a short gap might remain in the delivered video 200.

The insertion of the shorter second video sequence 2 results in a change in the fill level of the client's video buffer which, in this case, is reduced, as the replacement sequence 2 and thus the second video sequence 2 in the delivered video is shorter than the first replacement time slot 10.

In FIG. 1 in the graph at the bottom the delay between the video source and the delivered video at each time is shown.

Some delay is tolerable within limits. The HLS standard e.g. recommends that the buffer should have two to three segments, so that one segment more or less can indeed be considered as tolerable.

The diagram at the bottom of FIG. 1 shows that in this case the delay has a negative value of −4 (in arbitrary units) after the insertion of the second video sequence 2.

The right part of FIG. 1 refers to a further embodiment showing how a decreased delay resulting from e.g. using the embodiment described above can be used later-on has been used.

Here, the decreased duration of video 200, resulting from the embodiment described above, can be used to extend the requested replacement duration $T_{req2}$ for a following replacement time slot 11 of original duration Tit Specifically, a replacement duration of $T_{req2}=T_{11}+(T_{10}-T_2)$ can be requested to fill up the resulted gap in video time from the before mentioned embodiment.

Here, the duration $T_{11}$ for the second replacement time slot 11 is shorter than the requested duration $T_{req2}$ for replacement sequence 2a (time difference is $T_{req2}-T_{11}$). But this request can be made as there is a decreased delay due to the shift caused by the embodiment mentioned before.

Here, the replacement sequence 2a to be inserted in the second replacement time slot 11 as a replacement has a duration Tea that can be longer than the duration $T_{11}$ of the second replacement time slot 11 but is shorter than the requested duration $T_{req2}$.

The fourth video sequence 4 is then shifted to follow the inserted second video sequence 2a in the delivered video 200.

As the time difference $T_{req2}-T_{2a}$ is smaller than the previously accumulated time difference $T_{10}-T_2$, there is still negative delay, but it has decreased, as can be seen from the graph in FIG. 1.

Therefore, the video controller 300 can take into account the fill level of the video buffer when requesting second video sequences 2a as replacements.

If, for example, a negative delay has accumulated to 1.5 seconds (by the way of the first embodiment described above), the request for the second video sequence 2a can be extended from e.g. 30 seconds to 31.5 seconds, i.e. $T_{11}=30$ seconds, $T_{req2}=31.5$ seconds.

In the example shown, the actually delivered replacement sequence has a duration of $T_{2a}=30.5$ seconds. This would reduce the negative delay somewhat.

Figure 2:
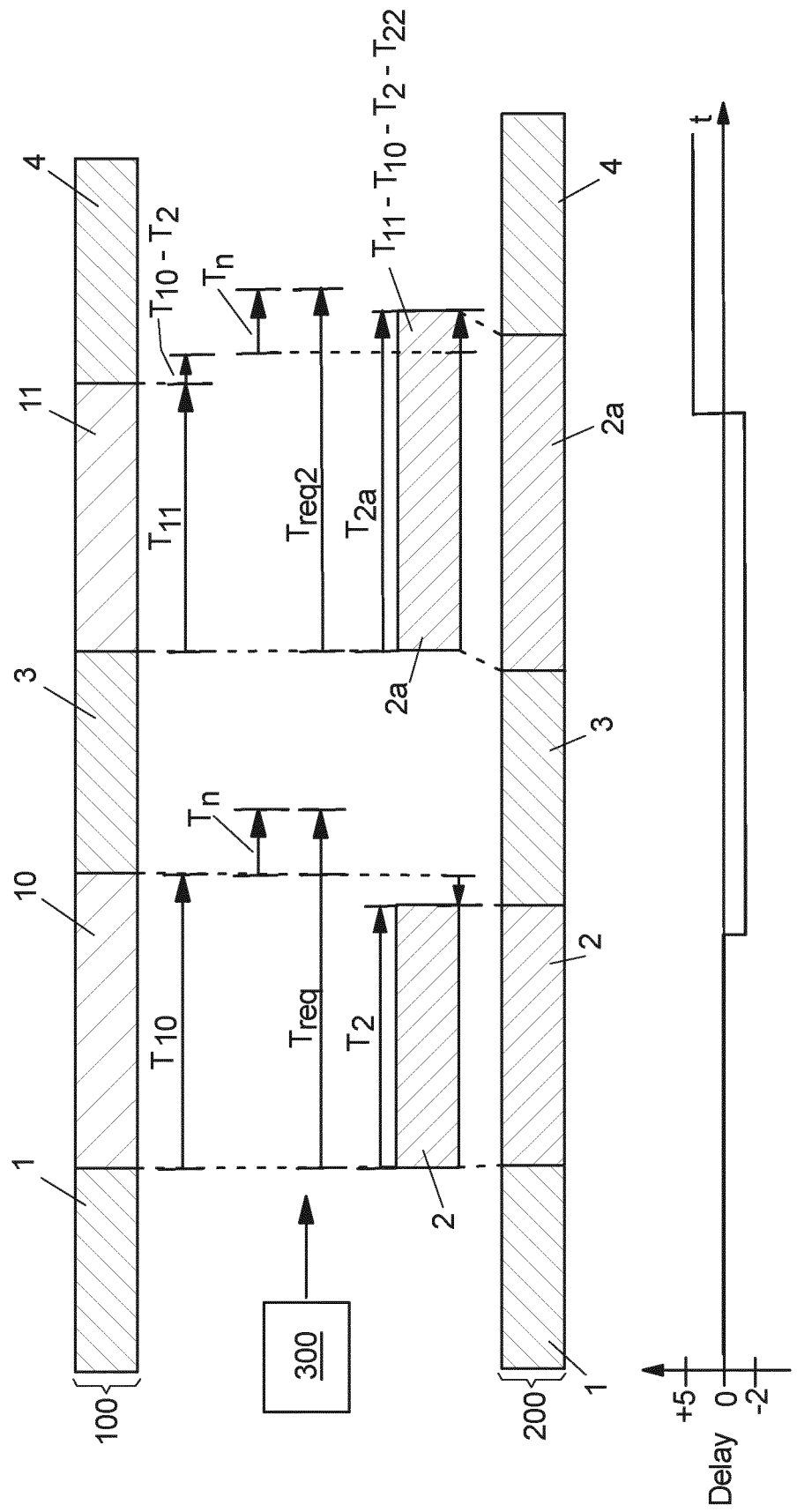
FIG. 2 shows another embodiment of video sequence insertions.

In FIG. 2 a further embodiment is described.

When requesting a replacement sequence 2, 2a for a replacement time slot 10, 11, the maximal duration is specified. If that maximal requested duration cannot be met, a shorter replacement video sequence 2, 2a is delivered. This generally results in a permanently negative delay in the delivered video 200 compared to the video source.

To minimize the absolute value of the average delay (i.e. to even out the delay as adjustment), it is possible to add an adjustment offset $T_n$ to the duration $T_{req}$ of the requested video sequence. This means, the requested maximum duration of video sequence 2 is deliberately longer, to—on average—even out the delay between the source video 100 and the delivered video 200.

In FIG. 2 it is shown that the second video sequence 2 (time duration $T_2$) is shorter by $T_{10}-T_2$ than the first replacement time slot 10 and the subsequent video sequence 3 is shifted towards the inserted second video sequence 2, just as in the first embodiment discussed in connection with FIG. 2.

For the next video sequence request, the duration $T_{req2}$ is determined as follows: $T_{req2}=T_{11}+(T_{10}-T_2)+T_n$.

With a longer duration $T_{req2}$ for the replacement sequence request, a longer video sequence 2a can be returned and inserted into the delivered video 200.

As can be seen from the graph at the bottom of FIG. 2, the delay is reverted accordingly. By monitoring the delay, the video controller 300 can add an adjustment offset $T_n$ whenever required to keep the delay on a desired value on average.

Figure 3:
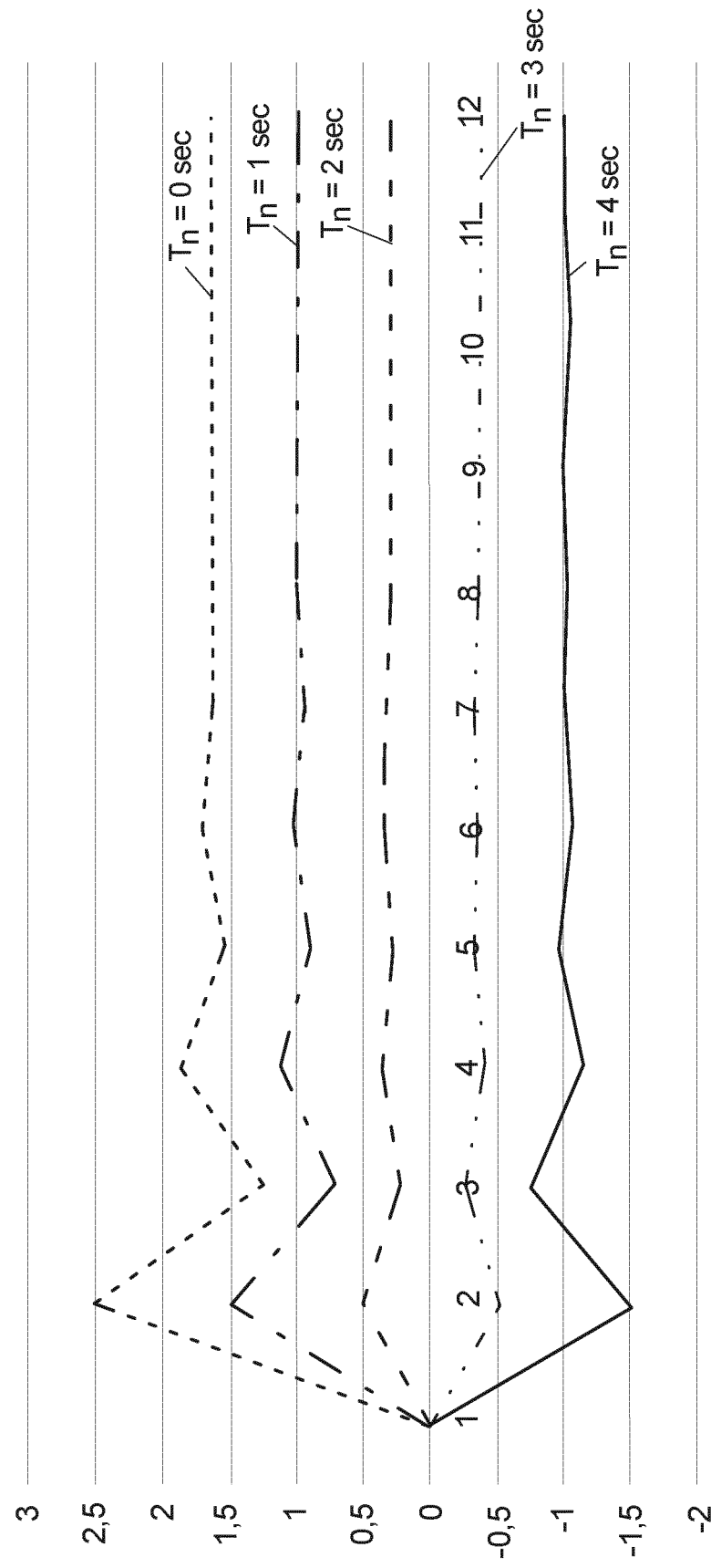
FIG. 3 shows some simulation results of the embodiment depicted in FIG. 2.

In FIG. 3 some simulation results for the embodiment shown in FIG. 2 are shown.

Here, an exemplary course of accumulated delays between the delivered video 100 and the source video 200 (on the y-axis) is shown over time (i.e. the handling of twelve replacement time slots 10, 11).

The simulations were performed with different constant values of the adjustment offset $T_n$ (0, 1, 2, 3 and 4 seconds). The simulated scenario involved a random set of available advertisements (i.e. requested second sequences 2, 2a) between 25 and 35 seconds. The assigned replacement time slots 10, 11 were 30 seconds long.

It can be seen that in this example a constant adjustment offset of $T_n=2$ seconds yields an average delay of 0.33 seconds asymptotically, which is better than other adjustment offsets $T_n$ tested.

REFERENCE NUMBERS 1 first video sequence
2, 2a second video sequence (replacement)
3 third video sequence
4 fourth video sequence
10 first replacement time slot in source video
11 second replacement time slot in source video
100 source video
200 delivered video
300 video controller
$T_{10}$ duration, time slot of first replacement time slot
$T_{11}$ duration, time slot for second replacement time slot
$T_2$, $T_{2a}$ duration, time slot of second video sequence
$T_n$ adaptation offset
$T_{req}$ duration of a requested video sequence
$T_{req2}$ second duration of a requested video sequence

The invention claimed is:

1. A method for controlling delivered video based on a source video, the source video comprising a first video sequence followed by a first replacement time slot, the first replacement time slot followed by a third video sequence, wherein the method comprises the following steps
   a) requesting a second video sequence with a maximum duration $T_{req}$ by a video controller to be inserted into a time slot corresponding to the first replacement time slot in the delivered video, the duration $T_2$ of the second video sequence being shorter or equal to $T_{req}$, in particular being different from the duration $T_{10}$ of the first replacement time slot;
   b) determining the time difference $T_{10}-T_2$ between the duration $T_{10}$ of the first replacement time slot and the duration of the second video sequence by the video controller;
   c) placing the second video sequence by the video controller into a time slot in the delivered video corresponding to first replacement time slot and shifting the subsequent third video sequence towards the second video sequence in the delivered video,
   and thereby providing a continuous video stream through influencing of the delay between the video source and the delivered video.

2. The method according to claim 1, wherein a time difference $T_{10}-T_2$ between the duration of the first replacement time slot and the duration of the second video sequence is used by the video controller to adapt a duration $T_{req2}$ of at least one further request for a replacement video sequence.

3. The method according to claim 1, wherein a temporal adjustment offset $T_n$ is added by the video controller to the requested duration $T_{req}$ of the second video sequence and/or the requested duration $T_{req2}$ of the at least one second video sequence.

4. The method according to claim 3, wherein the video controller adjusts the duration of the adjustment offset $T_n$ to control the delay between source video and delivered video.

5. The method according to claim 1, wherein the source video is a timed video stream, a scheduled video stream, a live linear video stream and/or a live live linear video stream.

6. The method according to claim 1, wherein the source video is an Internet video stream, in particular an HLS or DASH video stream.

7. The method according to claim 1, wherein the third video sequence is shifted towards the inserted second video sequence so that there is no time gap between the two video sequences.

8. The method according to claim 1, wherein the content of the second video sequence is personalized, in particular using an ID for a particular delivery device.

9. The method according to claim 8, wherein the second video comprises advertising content, broadcast content, program/content announcements, regionalized content and/or emergency notifications, in particular wherein the request of the second video sequence by the video controller is a personalized request.

10. A video controller for controlling delivered video, the source video comprising a first video sequence followed by a first replacement time slot, the first replacement time slot followed by a third video sequence, wherein the video controller comprises at least one computer or computer network configured to:

request a second video sequence with a maximum duration $T_{req}$ to be inserted into a time slot in the delivered video corresponding to the replacement time slot, the duration $T_2$ of the second video sequence being shorter or equal to $T_{req}$, in particular being different from the duration $T_{10}$ of the first replacement time slot, determine the difference $T_{10}$-$T_2$ of the duration $T_{10}$ of the first replacement time slot and the duration of the second video sequence, and place the second video sequence into a time slot in the delivered video corresponding to first replacement time slot and shifting the subsequent third video sequence towards the second video sequence in the delivered video, thereby providing a continuous video stream through influencing of the delay between the video source and the delivered video.

\* \* \* \* \*